(12) United States Patent
Wee et al.

(10) Patent No.: US 8,782,130 B2
(45) Date of Patent: Jul. 15, 2014

(54) METHOD AND SYSTEM FOR CLIENT-SIDE SCALING OF WEB SERVER FARM ARCHITECTURES IN A CLOUD DATA CENTER

(75) Inventors: Sewook Wee, San Jose, CA (US); Huan Liu, Sunnyvale, CA (US)

(73) Assignee: Accenture Global Services Limited, Dublin (IE)

( * ) Notice: Subject to any disclaimer, the term of this patent is extended or adjusted under 35 U.S.C. 154(b) by 65 days.

(21) Appl. No.: 13/612,137

(22) Filed: Sep. 12, 2012

(65) Prior Publication Data

US 2013/0007114 A1 Jan. 3, 2013

Related U.S. Application Data

(62) Division of application No. 12/697,854, filed on Feb. 1, 2010, now Pat. No. 8,433,749.

(60) Provisional application No. 61/169,522, filed on Apr. 15, 2009.

(51) Int. Cl.
 *G06F 15/16* (2006.01)
(52) U.S. Cl.
 USPC ........... 709/203; 709/223; 709/226; 709/227; 709/235
(58) Field of Classification Search
 CPC . H04L 67/1002; H04L 67/02; H04L 67/1008; H04L 67/1029
 USPC ........................ 709/227, 203, 223, 226, 235
 See application file for complete search history.

(56) References Cited

U.S. PATENT DOCUMENTS

| | | | |
|---|---|---|---|
| 5,774,660 A | 6/1998 | Brendel et al. | |
| 6,078,960 A | 6/2000 | Ballard | |
| 6,697,849 B1 * | 2/2004 | Carlson | 709/219 |
| 7,039,709 B1 * | 5/2006 | Beadle et al. | 709/227 |
| 7,110,962 B2 * | 9/2006 | Amon et al. | 705/14.73 |
| 7,636,917 B2 * | 12/2009 | Darling et al. | 718/105 |
| 8,020,203 B2 * | 9/2011 | Kumar et al. | 726/15 |
| 8,260,940 B1 * | 9/2012 | Vosshall et al. | 709/229 |
| 2005/0198200 A1 | 9/2005 | Subramanian et al. | |
| 2007/0266145 A1 * | 11/2007 | Nesbitt et al. | 709/224 |
| 2009/0157678 A1 * | 6/2009 | Turk | 707/6 |
| 2010/0088205 A1 | 4/2010 | Robertson | |

FOREIGN PATENT DOCUMENTS

EP 1662405 A1 5/2006

* cited by examiner

*Primary Examiner* — Nicholas Taylor
(74) *Attorney, Agent, or Firm* — Fish & Richardson P.C.

(57) ABSTRACT

A novel web server farm architecture is provided that combines various cloud components and innovatively maximizes their strengths to achieve a scalable, adaptable, load balanced computing architecture. In one embodiment, this architecture includes a storage host for static content hosting, a cluster of virtual machines (operating as web servers) for dynamic content hosting, and a dedicated application engine for monitoring the load of the virtual machines. A browser or end-application user of a web application is first routed to a static anchor page hosted on the storage host. The browser is subsequently presented with a list of virtual machines and data corresponding to their respective current loads. To access dynamic content, the browser is able to select from the virtual machines based in large part on the reported current loads of the virtual machines. Once a virtual machine is selected, the browser may communicate directly with the selected web server.

22 Claims, 7 Drawing Sheets

Exemplary Computer
System 700

METHOD AND SYSTEM FOR CLIENT-SIDE SCALING OF WEB SERVER FARM ARCHITECTURES IN A CLOUD DATA CENTER

CLAIM OF PRIORITY

This application is a divisional application of U.S. Utility patent application Ser. No. 12/697,854, filed Feb. 10, 2010, which claims benefit of and priority to U.S. Provisional Application No. 61/169,522, and filed Apr. 15, 2009, both of which are incorporated herein by reference in their entireties.

BACKGROUND

Cloud technology infrastructures are positioned to fundamentally change the economics of computing by offering several advantages over traditional enterprise technology infrastructures. First, technology infrastructure clouds provide practically unlimited infrastructure capacity (e.g., computing servers, storage) on demand. This capability is especially valuable for hosting high-performance web applications. Because certain web applications can have a dramatic difference between their peak loads and their normal loads, a traditional infrastructure may be ill-suited to support them. Traditional enterprise infrastructures would either grossly over-provision to account for the potential peak (thereby wasting valuable capital during off-peak hours), or, alternatively, provision according to "normal" loads and be unable to handle peak loads when they materialize. Instead of grossly over or under provisioning upfront due to uncertain or unpredictable demands, users can elastically provision infrastructure resources from the cloud provider's pool only when needed. Second, the pay-per-use model allows users to pay for the actual consumption instead of for estimated peak capacity. Third, a cloud data center infrastructure is much larger than most enterprise data centers. The economy of scale, both in terms of hardware procurement and infrastructure management and maintenance, helps to drive down the cost of the technology infrastructure further.

In a typical arrangement, an application owner may choose to host or operate a portion or all of an application in a web server farm in a cloud data center. Although a cloud data center can offer strong value propositions, it is very different from a traditional enterprise infrastructures, and migrating an application from a traditional enterprise infrastructure to a cloud data center is not trivial. Many performance optimization techniques rely on the choice and control of the specific infrastructure components. For example, to scale a web application, application owners typically either ask for a hardware load balancer or ask for the ability to assign the same IP address to all web servers to achieve load balancing. Unfortunately, neither option is available through popular cloud computing vendors. To take full advantage of a cloud data center, the application owners typically must understand the capabilities and limitations of individual cloud components, and may be required to re-design and re-architect their application to be cloud-friendly.

In traditional enterprises, application owners can choose an optimal infrastructure for their applications amongst various options from various technology hardware and software vendors. In contrast, cloud data centers are owned and maintained by the cloud providers. Due to the typical commodity business model, cloud computing providers generally offer only a limited set of infrastructure components. Commonly, these components are limited to: (virtualized) web servers, dedicated web application engines, and data storage/static hosts. However, each of these cloud components has significant limitations. For example, a typical virtual machine offered through a cloud infrastructure may have only limited types of virtual servers available. Furthermore, these servers will generally operate according to specifications that cannot be customized by or for the applications executing on the servers. In addition, application owners have little or no control of the underlying infrastructure. Moreover, for security reasons, many cloud infrastructure vendors disable several networking layer features conventionally available through enterprise technology infrastructures. These features include Address Resolution Protocol ("ARP"), "promiscuous mode," "IP spoofing," and IP multicast. Application owners have no ability to change these infrastructure decisions in a cloud infrastructure, and thus are incapable of benefiting from these features.

Another cloud component commonly offered by a cloud provider and used for hosting web presences is a storage host. Although highly scalable, typical cloud-offered storage hosts also have a few limitations. Specifically, these storage host components are able to host only static content. Often, in order to use a storage host as a web hosting platform, a cloud user can only access the non-SSL end point of the platform, thus compromising the security of the interaction. Typical dedicated application engines offered by popular cloud technology infrastructure providers also suffer from significant flaws. For example, one popular application engine is limited to supporting only a few programming languages. In addition, these application engines may have performance limits. For example, incoming and outgoing requests may be limited in size to 10 MB per request. Naturally, these limitations can negatively affect a user experience by prohibiting a significant portion of a user's desired service.

As discussed above, the commonly used cloud components have significant limitations. In particular, when used alone, none of the components are able to host a high traffic web presence (for example, web presences exceeding 800 Mbps of aggregate in and out traffic). One potential approach to the need for greater scaling is to use a traditional Domain Name System (DNS) load balancing technique to scale beyond the limitations (e.g., above 800 Mpbs). During conventional web address navigation techniques, when a user browses to a domain, the browser first asks its local DNS server for the IP address corresponding to the domain. Once the address is received, the browser contacts the IP address directly. In cases where the local DNS server does not have the IP address information for the requested domain, the local DNS server will contact other DNS servers that may have the information. Eventually, the request will percolate to the original DNS server that the web server farm (corresponding to the domain) directly manages. According to one conventional technique, the original DNS server can hand out different IP addresses (but directing to the same web application) to different requesting DNS servers so that the load could be distributed out among the servers sitting at each IP address.

Unfortunately, DNS load balancing also has drawbacks of its own: a lack of load balancing granularity and adaptability. First, DNS load balancing typically does a poor job of actually balancing the load amongst different web servers. For performance reasons, a local DNS server caches the IP address information. Thus, all browsers contacting the same DNS server would get the same IP address. Due to disparities in regional population and usage demographics, certain DNS servers could be responsible for a significantly larger number of hosts (browsers) relative to other DNS servers, and thus loads may not be effectively distributed between all DNS servers.

Second, traditional DNS load balancing techniques also lack adaptability. Since local DNS servers cache IP address information for a set period of time, i.e. for days, until the cache expires, a local DNS server will guide requests from browsers to the same web server. When traffic fluctuates at a time at a scale smaller than days, tweaking DNS server settings will have little effect on load balancing. Traditionally, this drawback was not so critical because the number of back-end web servers and their IP addresses were static anyway. However, where the number of requisitioned components is dynamically scalable according to consumption, the scalability of a cloud-based web server farm may be seriously influenced. A cloud-based web server farm elastically changes the number of web servers tracking the size of traffic in minute granularity. DNS caching persisting over days (as per traditional DNS schemes) dramatically reduces this elasticity. For example, even if a web server farm in a cloud data center increases the number of web servers serving at peak load, IP addresses for new web servers will not be propagated to DNS servers that already have cached IP addresses. Therefore, the requests from hosts relying on those DNS servers may be sent to long-requisitioned web servers and possibly overloading them while newly requisitioned web servers remain idle.

Other load balancing techniques include both dedicated hardware load balancers and load balancing software. Dedicated hardware load balancers intercept data packets en route to a web server and distribute the packets among web servers according to some packet balancing scheme (typically round-robin), ideally effecting a corresponding balance of load. Unfortunately, hardware load balancers are not typically available as cloud computing components. Load balancing software implementations are typically executed from a non-dedicated platform (e.g., a virtual server) and perform similarly to hardware load balancers. However, since software load balancing implementations do not process traffic, but rather, only forward the data packets to the appropriate web servers, for each incoming (and outgoing) packet, the load balancer must first receive the data from a host (browser) and subsequently forwards to a web server. This interaction results in a doubling of the network bandwidth consumption for each individual packet transfer (and, thereby halving the network throughput). Moreover, the scalability of a software load balancing solution may also be limited by a cloud vendor's security restrictions, since traditional techniques used to scale software load balancers require features which may be prohibited by a cloud vendor on a cloud computing infrastructure component.

Migrating existing enterprise applications to a cloud is not as simple as measuring the capabilities of cloud components and identifying their limitations. First, the performance of individual web servers offered through cloud vendors can be an entire order of magnitude lower than available state-of-the-art web server hardware solutions. Second, the traditional load balancing-based approach may not work on public cloud environments because the network bandwidth available to the software load balancer is limited. Furthermore, load balancing is not typically scalable and, even when implemented, often incurs many severe limitations, such as very limited program language support and limits on the size of transferred files. Also, static content hosts which are superior for scalability but, regrettably, are only viable options for static content.

SUMMARY

As a solution to the problems noted above, a novel, scalable web server farm architecture is provided that combines various cloud components and innovatively maximizes their strengths to achieve a scalable, adaptable, load balanced computing architecture. In one embodiment, this architecture includes a storage host for static content hosting, a cluster of virtual machines (operating as web servers) for dynamic content hosting, and a dedicated application engine for monitoring the load of the virtual machines. A browser or end-application user of a web application is first routed to a static anchor page hosted on the storage host. The browser is subsequently presented with a list of virtual machines and data corresponding to their respective current loads. To access dynamic content, the browser is able to select from the virtual machines based in large part on the reported current loads of the virtual machines. Once a virtual machine is selected, the browser may communicate directly with the selected web server. By utilizing a storage host, the qualities of superior scalability may be leveraged and additional storage hosts may be requisitioned (or deactivated) as necessary. Likewise, since the browser is enabled to perform the load balancing, adaptability is achievable on a finer level.

In another embodiment, a method for hosting an application in a cloud data center that enables scalability and adaptability is provided that comprises overcoming a load balancer's network bandwidth limit issue by allowing a client-side web browser to choose an optimal web server by exposing the list of web server IP addresses and their individual load information. In further embodiments, this information is delivered initially through a static content host. In still further embodiments, a dedicated application hosting engine is used to collect server load information, to make auto-scaling decisions and to visualize performance history to administrators. According to these embodiments, the method comprises presenting the individual load information of a multitude of available web servers to a client-side web browser and soliciting a selection from the browser. In further embodiments, the selection may be made automatically via a random selection process that weights the likelihood of each web server to correspond inversely with the load of the particular web server.

In a still further embodiment, a method for establishing a connection between a client-side browser and a target web server to facilitate client-side scaling of a web server farm architecture in a cloud data center is provided that achieves client-side scaling by receiving a data request from a client browser, determining the appropriate target web server to establish a connection with the client browser based on current load, forwarding the request to a proxy hosted on the same virtual machine as the web server, constructing the request as a separate request within the proxy, sending the request from the proxy to the target web server, processing the request in the target web server, and returning the result of processing to the client browser. According to this embodiment, the ability to load-balance a web application hosted on a plurality of web servers is allocated to a client-browser, thus enabling load balancing on a granular level.

Each of the above described novel methods and system feature the ability to provide a technology architecture comprising cloud computing devices commonly offered by cloud computing vendors that offers scalability and load balancing beyond that which is available through the components on an individual level. In short, a user's application-operating experience in a cloud computing infrastructure is more consistently and effectively performed based on novel and specific combination of cloud computing components.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
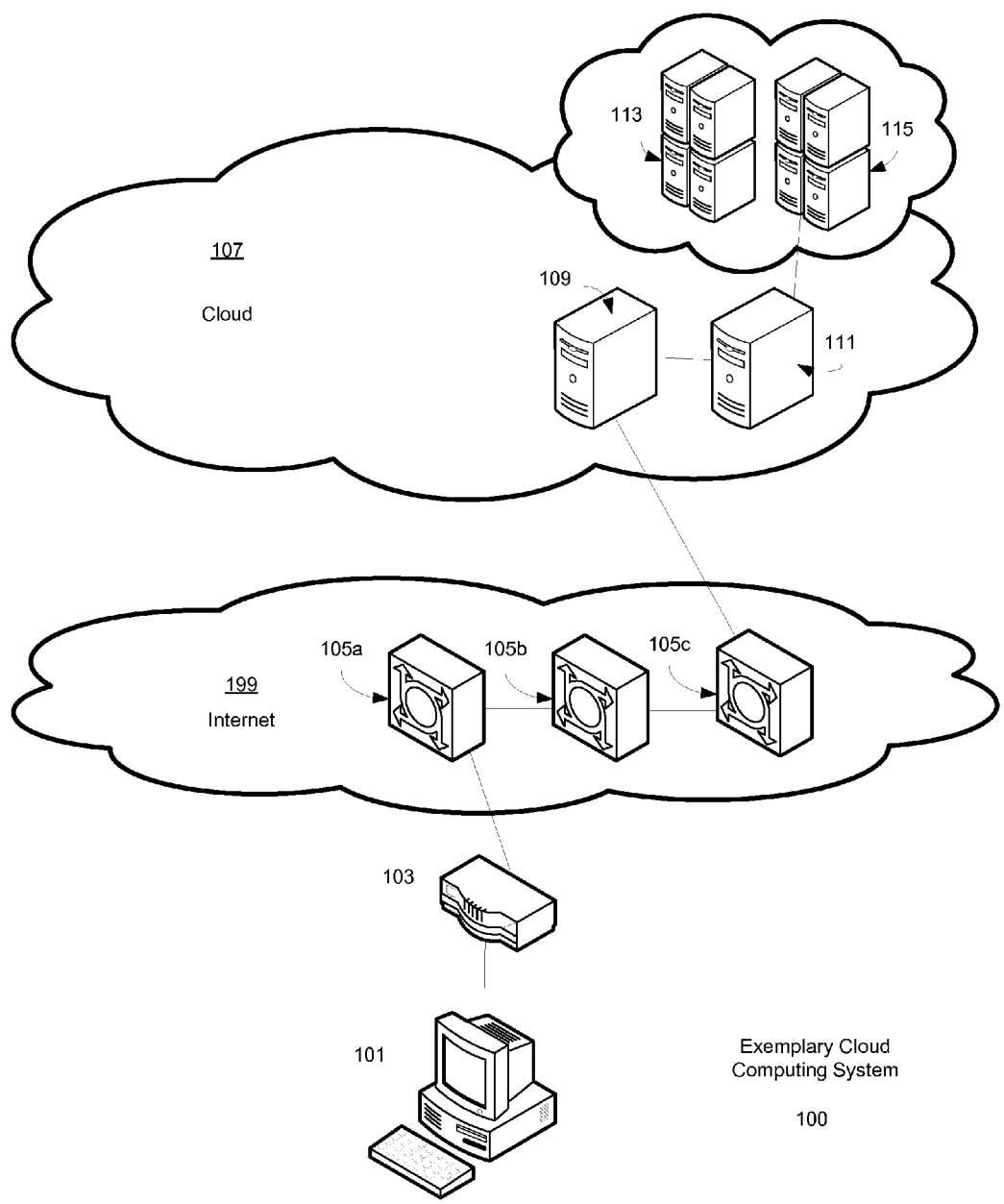
FIG. 1 depicts a graphical depiction of an exemplary cloud computing environment, in accordance with embodiments of the present invention.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known processes, procedures, components, and circuits have not been described in detail as not to unnecessarily obscure aspects and features of the subject matter.

Portions of the detailed description that follow are presented and discussed in terms of a process. Although steps and sequencing thereof are disclosed in figures herein (e.g., FIGS. 5 and 6) describing the operations of this process, such steps and sequencing are exemplary. Embodiments are well suited to performing various other steps or variations of the steps recited in the flowchart of the figure herein, that not all of the steps depicted may be performed, or that the steps may be performed in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The claimed subject matter is directed to a method and system for enabling client-side load balancing in cloud-hosted web applications to improve upon conventional techniques for load balanced, scalable implementations. In one embodiment, an architecture for a cloud-hosted web application that allows load balancing on a granular level while maintaining the scalability that is the hallmark of cloud data centers, web server farms, and cloud computing in general.

Exemplary Cloud Data Center

With respect to FIG. 1, a graphical depiction 100 of an exemplary cloud computing environment 100 is depicted, in accordance with embodiments of the present invention. According to one embodiment, environment 100 includes a plurality of communicatively interconnected computing environments to each other and/or to the Internet. As presented, environment 100 may include a personal computer 101, a network routing device 103, one or more domain name system (DNS) servers 105a, 105b, 105c, and a plurality of cloud computing components (e.g., hardware servers 109, 111, and virtual machines 113, 115).

As depicted in FIG. 1, a communicative coupling may be established between a personal computer 101 and one or more virtualized instances (e.g., virtual machines 113, 115) of a cloud data center 107. In one embodiment, a web application may be hosted on an instance of a virtual machine 113, 115 and accessible through a client-browser executing on a personal computer 101. As depicted, cloud computing environment 107 includes a portion of an exemplary cloud computing data center. This graphical representation may be suitable to represent any organization or arrangement of networked computing devices. In typical embodiments, additional computing resources may be requisitioned from the cloud data center dynamically, as needed. Likewise, when resources are over-provisioned, additional computing resources may be relinquished to manage operating costs. Thus, such a graphical representation may represent the infrastructure of a typical cloud data center.

In one embodiment, a personal computer 101 may display content from a web application hosted on a virtualized instance of a web server 113, 115 on a web browser. A user of the personal computer 101 may navigate to a website corresponding to the web application via a URL web address registered to the web application with one or more DNS servers. As presented, the personal computer 101 may be itself communicatively coupled to a networking device such as a router 103 and further coupled to the Internet 199 through a vast network of interconnected computing devices. In some embodiments, by entering the URL registered to the web application in a web browser, the local DNS server (e.g., DNS server 105a) is queried to resolve the domain name resolution and determine the specific IP address of the requested website. In some instances, the website may not be registered with the local DNS server 105a, and additional DNS servers 105b, 105c may be sequentially queried to determine the address of the web application.

Once the web address has been resolved, the browser is able to communicate with one or more computing resources operated by the web application. In one embodiment, data requests may be received in a computing system operating as a storage host (e.g., storage host 109). Specifically, the data request may be hosted in a static anchor page executing on the storage host 109. According to one embodiment, dynamic content is stored on one or more disparate web servers. The storage host 109 may direct requests directly to the web server (e.g., web server 111). In still further embodiments, the dynamic content is hosted on a plurality of virtual machine instances (e.g., instances 113, 115) hosted on a web server 111. In yet further embodiments, data requests may be received in a proxy web server hosted on the same physical web server 111 as the virtual web server 113, 115 containing the requested data. Additionally, a dedicated application engine (not shown) coupled to the plurality of (virtual) web servers may be executed on a cloud computing resource (e.g., another web server) and used to monitor current load information of the web servers.

Exemplary Cloud Data Center Components

Figure 2:
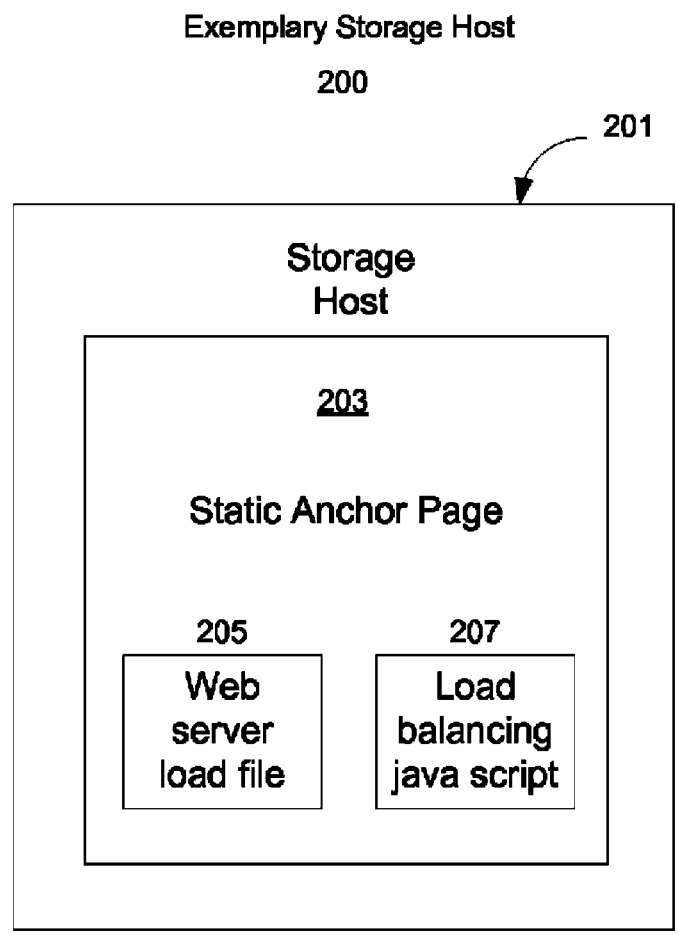
FIG. 2 depicts a block diagram of an exemplary storage host for hosting static content in a cloud computing environment, in accordance with embodiments of the present invention.

For a web application, static content may be generated or provided for display to the end users (e.g., clients via a client browser) of the web application. In some instances, the web application may be hosted in a cloud computing infrastructure (e.g., on a cloud computing component or virtualized machine hosted from a cloud computing component). In further embodiments, the aforementioned static content provided by a web application may be hosted in a dedicated storage host. This storage host may be implemented as, for example, a storage system available through conventional internet-based storage services operating and/or in a cloud computing environment. Data may be stored in a storage host as objects or units of up to a pre-defined size and further organized or delineated to distinguish ownership between various users. FIG. 2 depicts a block diagram 200 of such an exemplary storage host for hosting static content in a cloud data center, in accordance with embodiments of the present invention. As presented, the storage host 201 of FIG. 2 includes a static anchor page 203 further comprising a web server load file 205, and a load balancing java script 207.

According to some embodiments, for each dynamic page of data of a web application, a static anchor page 203 is created to correspond to the specific dynamic page. Clients of the web application may access the static content directly by establishing a connection to the static anchor page 203. In one embodiment, the IP address (or, alternatively, the re-directed URL) corresponding to the web application connects to the static anchor page 203. If access to dynamic content of the web application is requested by the client (e.g., through a web browser, for instance), the web browser may choose from a plurality of web servers hosting the dynamic content to access. In one embodiment, the ability to load balance is provided by allowing the web browser to choose from among the plurality of web servers based on load information available through the storage host and/or static anchor page.

For example, according to some embodiments, the server file 205 and the load balance file 207 may be implemented as two static javascript files. The server file 205 contains the list of IP addresses of a number of web servers containing the dynamic content of the web application and the respective individual load (such as CPU, memory, bandwidth, etc.) information of each web server. In some embodiments, the list may be filtered to provide only the currently available (e.g., operating web servers). In further embodiments, the server file 205 may consist of a set of pre-defined javascript function calls which, when invoked, return the number of web servers, their IP addresses and their load, respectively. In still further embodiments, the load balance file 207 may contain the client side load balancing logic code in javascript. In alternate embodiments, the load balance file 207 and the web server file 205 may be comprised in a single file or distributed among a multitude of files. To achieve high scalability in delivering the anchor page, the server and load balance file are all hosted on the static host component. According to some embodiments, the data comprised in the load balance file 207 and the server file 205 may be updated periodically by an application engine monitoring the web servers wherein the dynamic content of the web application is hosted.

Figure 3:
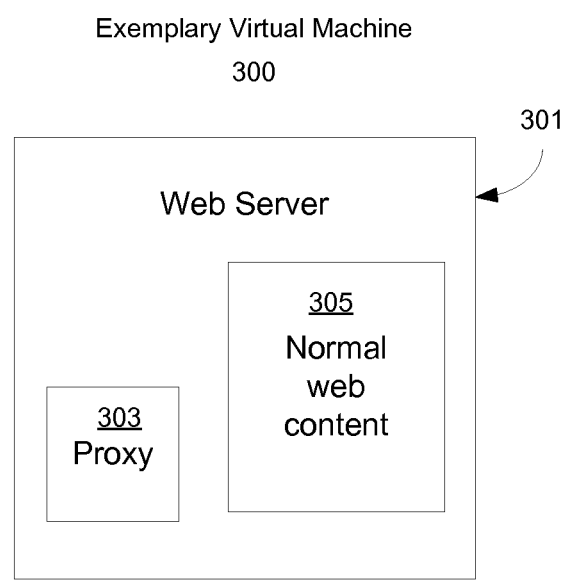
FIG. 3 depicts a block diagram of an exemplary web server for hosting dynamic content in a cloud computing environment, in accordance with embodiments of the present invention.

According to some embodiments, a web application may also generate or provide dynamic content for display to its users in addition to the static content described above. For embodiments in which the web application is hosted in a cloud data center, the dynamic content provided by the web application may be hosted among one or more web servers in a web server farm, for example. A web server farm may be implemented as a collection of both actual physical computing systems (e.g., server "blades" or the like) as well as virtual machines operating as web servers. In one embodiment, these web servers comprise cloud computing components, and are therefore capable of being dynamically requisitioned by the application (or other monitoring agent) and allocated within the cloud data center. In some embodiments, a single web application may provide dynamic content on separate, complete and individually integrated (e.g., fully capable) instances, with each instance executing in a separate virtual machine of a plurality of virtual machines. FIG. 3 depicts a block diagram 300 of such an exemplary web server for hosting dynamic content in a cloud data center, in accordance with embodiments of the present invention. As presented, the web server 301 of FIG. 3 includes a proxy server 303, and server hosting normal dynamic web content 307.

According to some embodiments, communication requests received from client browsers requesting access to dynamic content of a web application may be received and processed through an intermediary such as a proxy server 303. In typical embodiments, the client browser may request some service or other dynamic content, such as a file, connection, web page, or other resource, available from the application. The proxy server 303 may evaluate the received requests according to pre-determined filtering "rules." For example, the proxy server 303 may filter traffic by IP address or protocol. If the request is validated by the filter, the proxy may provide the resource by connecting to the relevant web server 305 and requesting the service on behalf of the client. By filtering traffic requests through a proxy server 303, the web application is able to benefit from improved security and access speed. In additional, regional restrictions may be bypassed, thereby allowing an improved allocation of the load experienced at certain DNS servers due to aforementioned disparities in regional population and usage demographics.

Application Hosting in a Web Server Farm

In a typical web application hosting process, user-accessible content may be stored in dynamically scalable computing resources, such as a cloud computing environment. A user of the web application (or "client") may navigate to the content provided by the web application by navigating (e.g., via a browser) to a URL or IP address corresponding to the web application. In some instances, DNS resolution of a web address may resolve to the IP address of the web application. In conventional web-hosted applications, an application-side load balancer may receive a data request from a client and determine the appropriate web server to forward the data request to. However, as described above, this technique suffers from significant flaws, not least among them, an inability to effect proper scaling in a cloud computing environment, and load balancing that is ineffective to address extreme or significant traffic flux during time periods of less than the duration of a DNS server's cache, possibly lasting up to a few days or more.

Figure 4:
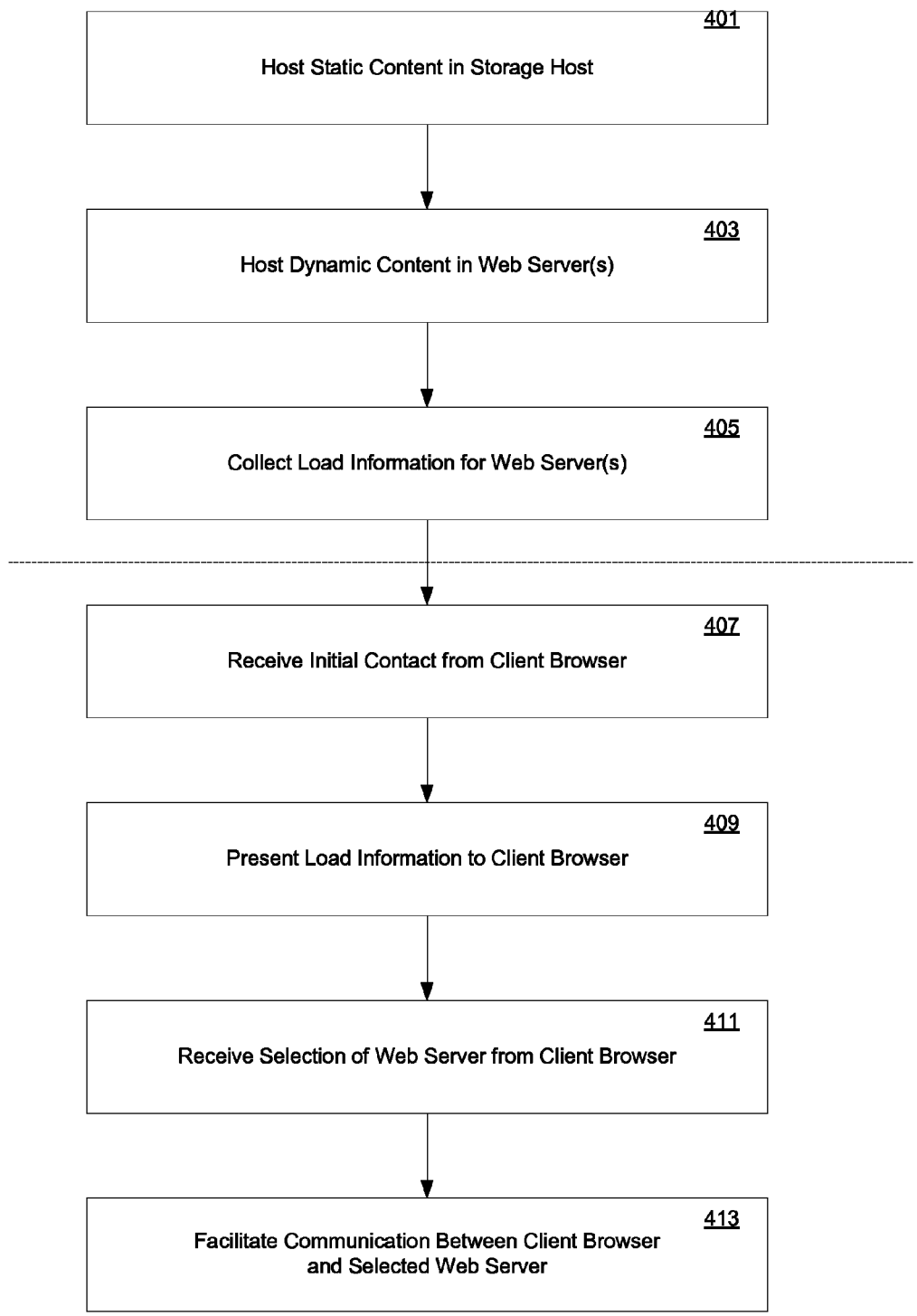
FIG. 4 depicts a flowchart of a method for hosting an application in a cloud data center that enables scalability and adaptability, in accordance with embodiments of the present invention.

According to one aspect of the claimed subject matter, a method is provided for hosting an application in a cloud data center that enables client-side load balancing of the application's computing resources to avoid the limitations of conventional cloud computing architecture paradigms. As presented in FIG. 4, a flowchart of an exemplary method 400 for hosting an application in cloud data center is depicted, in accordance with embodiments of the present invention. Steps 401-413 describe exemplary steps comprising the method 400 in accordance with the various embodiments herein described.

At step 401 of the method 400, static content for the web application is hosted on a storage host. The static content may be hosted by employing an online-storage service, such as those available through cloud computing vendors. In one embodiment, the static content may be stored on a computing system operating as a dedicated storage host such as the storage host 201 as described above with respect to FIG. 2, including a static anchor page displaying the static content and one or more files corresponding to the location of the dynamic content corresponding to the web application.

At step 403, the dynamic content of the web application is hosted in a plurality of web servers. Dynamic content may, according to some embodiments, consist of a plurality of dynamic web pages, with each page corresponding to a static anchor page hosted in a storage host at step 401. The dynamic content may be similarly hosted by employing online-web hosting services, such as a web server farm available through cloud computing vendors. In one embodiment, the dynamic content is hosted on one or more computing systems operating as web servers such as the web server 301 as described above with respect to FIG. 3, which may include a proxy web server 303 and the dynamic content 305 (e.g., stored in memory of a computing system). In one embodiment, the proxy web server (e.g., proxy web server 303) and the computing system hosting the dynamic content 305 may be implemented as instances of virtual machines executing from the same physical computing system and/or web server, with each instance communicatively coupled to other components in the cloud and accessible to browsers through the Internet. In further embodiments, the normal web content (e.g., web content 305) may be communicatively coupled to the static anchor page hosted in step 401, in some cases through proxy 303. In still further embodiments, a plurality of physical computing systems may execute a larger host of individual instances of virtual machines hosting the dynamic content and/or a corresponding proxy server. Client browsers attempting to access the dynamic content (e.g., via an IP address) may be directed to one of the individual instances.

At step 405, load information is collected for the web servers (either virtual or physical) hosting the dynamic web content of the application in step 403. The load information for a particular web server may comprise, for example, the bandwidth available to a network connection for that specific web server. Load information may also include the total, available and consumed memory and processing capabilities of the individual web server. The load information may also comprise a representation of the available bandwidth and/or bandwidth consumed with respect to the total estimated bandwidth available, expressed as a percentage, for example. The load information may also comprise an estimation derived from determining the latency (e.g., ping) for a data communication performed with the particular web server. In one embodiment, the load information is collected by a dedicated application engine monitoring the web servers. According to such embodiments, the load information may be periodically updated according to pre-determined intervals. In still further embodiments, the application engine may be executed from the storage host, from the computing system(s) upon which instances of the web server are hosted, and/or on a discrete computing system separate from both storage host and the plurality of web servers. The application engine may also be capable of providing additional features, such as providing a visualization of the performance history (in terms of load experience) of requisitioned web servers.

While steps 401-405 have been depicted in sequential order, it is to be understood that steps 401-405 may be performed in a different order, or simultaneously, according to various embodiments. In alternate embodiments, steps 401-405 may be continuously performed while an application is hosted, with steps 407-413 being performed whenever a request for data is initiated by a client browser.

At step 407, an initial contact is received by the web application. The initial contact may be received as an HTTP request from a web browser of a client of the web application, for example. In some embodiments, the contact may be initiated by a client through a web-browser by navigating to the web address (e.g., URL) or the IP address of the web application. In one embodiment, the contact may be received in the storage host corresponding to the web application, and static content from a static anchor page (e.g., static anchor page 203) may be loaded (e.g., displayed on the client's web-browser).

At step 409, the load information collected in step 405 is presented to the client browser from whom contact is received previously at step 407. In one embodiment, the load information collected at step 405 is used to update a web server file 205 stored on the static anchor page 203. When a data request is received from a client browser at step 407, a load balancing file 207 may be used to present the load information to the client browser via a plurality of function calls comprised in the balancing file 207. The load information may be further displayed to the actual client (e.g., the user of the web browser). In alternate embodiments, the load information may not be visible to the client. The load information presented to the client may also comprise a list of the available (e.g., active) web servers and the respective IP addresses corresponding to the list of available web servers. In one embodiment, presenting load information may be performed by one or more function calls comprised in a load balancing file 207.

At step 411, a web server hosting dynamic content is selected. The web server may be selected based on the load information presented at step 409. The web server may be selected automatically by the web browser. For example, the web browser may automatically select the web server with the "lightest" estimated load or experienced traffic (e.g., the web server with the least amount of bandwidth usage. Alternatively, the web browser may select the web server with the least proportional load (e.g., as a percentage in terms bandwidth consumed over total bandwidth). By automatically selecting a web browser based on least amount of estimated load, client-side load balancing may be facilitated that enables load-balancing on a granular (per client) level, thereby In embodiments where the load information is displayed to the client at step 409, the client may be prompted to select the web servers. In still further embodiments, the web browser may be automatically selected by the web browser randomly. According to these embodiments, each available web browser may be assigned a weighted likelihood of being selected that is inversely proportional to the current estimated load of the web server. Thus, a web server with a lighter load would have a greater likelihood of being selected relative to a web server with a greater load. By randomly selecting a web browser based upon assigned probabilities that are inversely proportional to the current estimated loads, for implementations where load information is not regularly updated (or updated according to longer intervals), a sudden surge of traffic to a previously lightly burdened web server may be avoided.

Once a selection of a web server is received at step 411, dynamic content hosted on the selected web server may be accessed at step 413. Accessing the dynamic content may be performed by, for example, facilitating communication between a web-browser of a client and the selected web server. In one embodiment, load information presented to the client browser at step 409 may include the IP addresses of the computing systems or virtual instances of the web servers. According to such an embodiment, the dynamic content of the web application may be accessed at step 413 by forwarding and/or directing a data request from the client browser to the IP address of the web server selected at step 411. In some embodiments, the forwarded (and/or directed) data requests may be received in an intermediary such as a proxy web server communicatively coupled to the dynamic content. The web server filters data access requests and fetches the requested data for filtered requests. In one embodiment, multiple data requests from a corresponding number of client web-browsers may be processed and allocated to selected web servers according to method 400 simultaneously.

According to further embodiments, when the load experienced or traffic encountered at the web servers in the aggregate exceeds or constricts beyond one or more thresholds, the number of web servers may be automatically scaled. For example, if all or a substantial majority of the web servers experience heavy load, additional computing resources (e.g., storage hosts, web servers, application engines, etc.) may be dynamically requisitioned from the cloud infrastructure to accommodate the larger number of clients. Conversely, if a plurality of web servers are idle and/or a majority experience only light load, the computing resources corresponding to one or more web servers may be relinquished.

Figure 5:
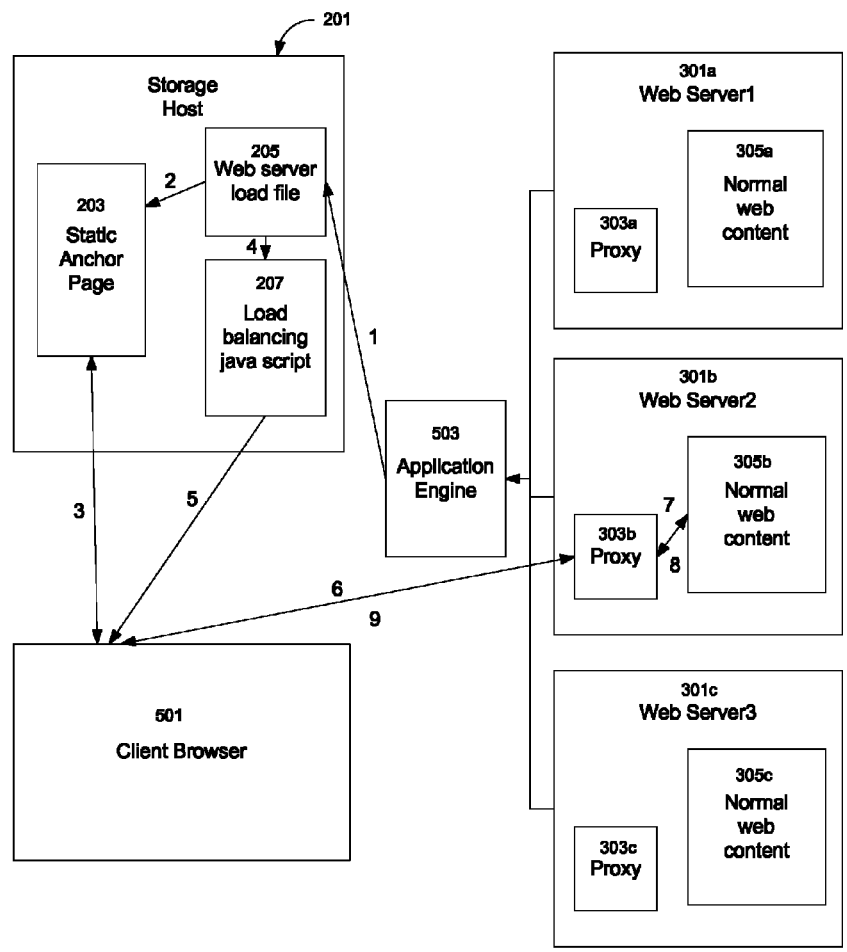
FIG. 5 depicts a data flow diagram of a client-side load balanced web server system in a cloud computing infrastructure, in accordance with embodiments of the present invention.

FIG. 5 depicts a data flow diagram 500 of a client-side load balanced web server system in a cloud data center performing the method 400 of hosting an application in cloud data center, in accordance with embodiments of the present invention. As presented in FIG. 4, data flow may include interaction between a client browser (e.g., client browser 401) and a plurality of cloud components (e.g., storage host 201, application engine 403, and plurality of web servers Web Server1 301a, Web Server2 301b, and Web Server3 301c).

As described above with respect to step 405 of process 400, load information from the plurality of web servers Web Server1 301a, Web Server2 301b, and Web Server3 301c is collected by an application engine 403. The load information may be collected repeatedly at periodic intervals. The load information is used to update the web server load file 205 at Time 1 of FIG. 5.

As described above with respect to step 407, a data request (e.g., initial contact) seeking access to the content of the web application from a client browser 401 is received in the static anchor page 203 at Time 2. The static content may be loaded to the client browser at Time 2 of FIG. 5. As described above with respect to step 409, once the data request is received, the web server load file 205 is examined to determine the current load information of the plurality of web servers hosting the dynamic content at Time 3, and the one or more function calls of the load balancing file 207 is used at Time 4 to present the load information (which may include the IP address of the web servers) to the client browser 401 at Time 5. Once the Client Browser receives the load information, a selection of a target web server is determined, and the selected web server is contacted directly (via its IP address) at Time 7. According to some embodiments, data requests to the selected web server may be filtered by an interposing proxy server (e.g., 303b) at Time 6. Data requests from the client browser 401 in such embodiments may be intercepted and repackaged in the proxy 303b prior to sending to the web server containing the requested web content (e.g., normal web content 305b) at Time 7. The data requested may be returned to the proxy 303b at Time 8, before being repackaged again and transmitted to the Client Browser 401 at time 9.

Client-Side Load Balancing of a Web Server Farm

According to one aspect of the claimed subject matter, for each dynamic page of content of a web application hosted in a cloud data center, a corresponding anchor static page is created. In some embodiments, the anchor static page may include two static javascript files: the server file and the load balance file. The server file contains the list of IP addresses and the individual load information (such as CPU, memory, bandwidth, etc.) of the web servers in the web server farm hosting the dynamic content and corresponding to the web application. In one embodiment, the server file may consist of a set of pre-defined function calls which return the number of web servers, their IP addresses and their load. According to one embodiment, the function calls may be programmed in javascript, for example. The load balance file may contain the programming instructions to perform client side load balancing (e.g., processing load information and selecting a web server based on the load information). The load balance file may also be implemented in javascript, for example. To achieve high scalability in delivering the anchor page, the server and load balance file are all hosted on the static host component.

Figure 6:
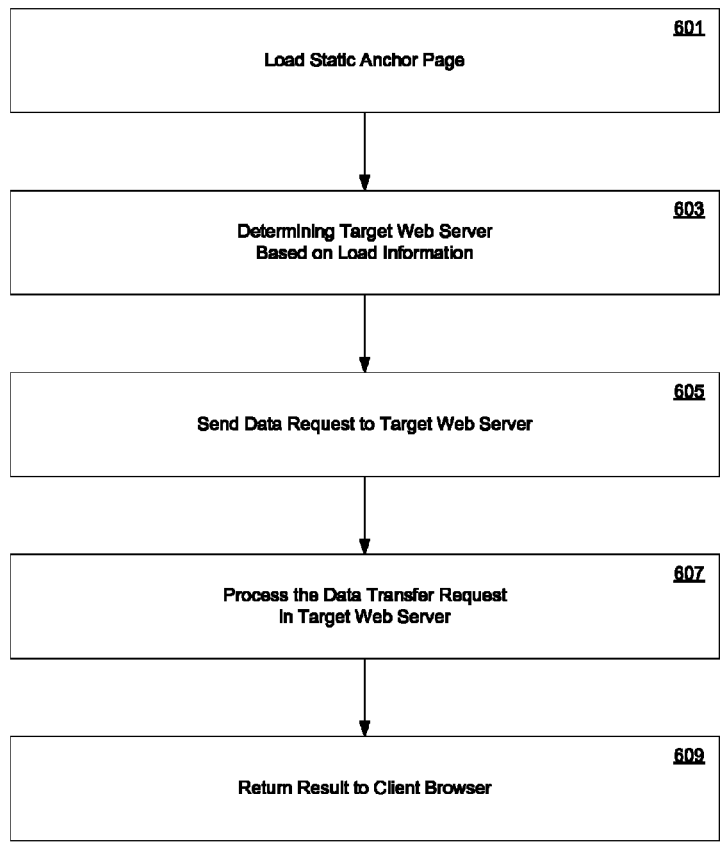
FIG. 6 depicts a method for establishing a connection between a client-side browser and a target web server to facilitate client-side scaling of a web server farm architecture in a cloud data center, in accordance with embodiments of the present invention.

FIG. 6 depicts a method 600 for establishing a connection between a client-side browser and a target web server to facilitate client-side scaling of a web server farm in a cloud data center, in accordance with embodiments of the present invention. Steps 601-609 describe exemplary steps comprising the method 600 performed in response to receiving a communication request from a client browser in a static anchor page of a web application, in accordance with the various embodiments herein described.

At step 601, the static anchor page is loaded in client browser by a static anchor page. Loading the static anchor page may be performed by, for example, transmitting the static data allocated for client access to the web-browser of the client seeking access.

At step 603, a target web server is determined based on load information corresponding to the web server(s). Determining the target web server may be performed by, for example, examining the load file to determine to which web server to receive the actual request from a client browser. In one embodiment, the target web server may be determined by automatically selecting the web server with the lowest current load according to various metrics described above. In alternate embodiments, the user of the client browser may be solicited for a selection of the target web server. In still further embodiments, the target web server may be selected at random according to an algorithm wherein the probability of choosing any one is inversely proportional to its relative load. In one embodiment, the weighted random distribution algorithm is designed to avoid all client browsers flashing to the same web server at the same time.

At step 605, once a target web server is determined at step 603, a data request from the client browser requesting access to dynamic content is received and. In some embodiments, the data requests may be filtered through a proxy server (for performance and/or security reasons). According to such embodiments, the data request from a client browser may be sent to a proxy server at step 605 before ultimately being relayed to the target web server. The proxy server may comprise a separate (virtual) server executing in the same physical machine or platform as the associated web server. In one embodiment, once a target web server is determined, function calls in the load balance file (e.g., load balance file 207) javascript dynamically load content javascript from the chosen web server. The function calls in the load balance file may be implemented as javascript. The content from the chosen web server may also be loaded as javascript.

In one embodiment, the data request sent to the proxy on the target web server platform may include three pieces of information: the browser cookie associated with the website of the application; the parameters used when the browser queried the anchor page; and the html POST data in the request, if any. The POST data may include, for example, a URL web address corresponding to the website, and a message body specifying information for an action being requested. The proxy may also perform some filtering on the data requests (e.g., IP address and/or protocol). For accepted requests, the proxy uses the cookie, parameters and POST data to re-construct a new http request to fetch the data requested, which it then sends to the dynamic content web server (sitting on the same virtual machine instance in some embodiments).

At step 607, the target web server processes the received data request. Processing the received data request may include, for example; invoking a dynamic script processor as necessary. In embodiments where a proxy server is featured, once the target web server processes the data request, the result of the processing is returned to the proxy. The proxy server may re-constructs the result into a browser-compatible file (e.g., javascript) and send the re-constructed result on to the client browser.

At step 609, the client browser executes the returned result from the target web server. In alternative embodiments, the returned result may consist of javascript from the proxy. Executing the returned result may also include updating the page display in the web browser to display the dynamic content received from the web application and/or updating any browser cookies if a set-cookie header has been returned.

Exemplary Computing Environment

Figure 7:
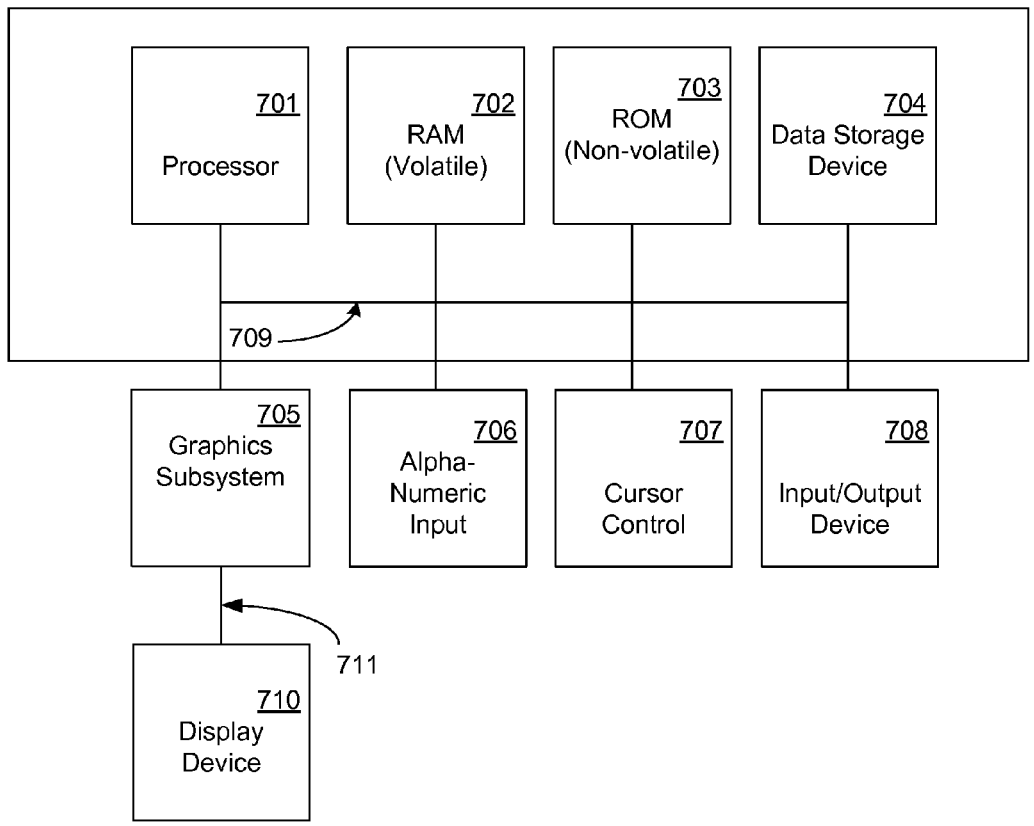
FIG. 7 depicts an exemplary computing environment from which various components may be executed, in accordance with embodiments of the present invention.

As presented in FIG. 7, an exemplary computing environment upon which embodiments of the present invention may be implemented includes a general purpose computing system environment, such as computing system 700. In its most basic configuration, computing system 700 typically includes at least one processing unit 701 and memory, and an address/data bus 709 (or other interface) for communicating information. Individual components of a cloud data center may comprise computing environments such as the one described in FIG. 7. For example, a storage host, a web server and an application engine may individually or collectively be implemented as or hosted on one or more such computing systems. In other embodiments, one or more instances of virtual computing environments may be hosted on computing environments as herein described. Depending on the exact configuration and type of computing system environment, memory may be volatile (such as RAM 702), non-volatile (such as ROM 703, flash memory, etc.) or some combination of the two. Computer system 700 may also comprise an optional graphics subsystem 705 for presenting information to the computer user, e.g., by displaying information on an attached display device 710, connected by a video cable 711.

Additionally, computing system 700 may also have additional features/functionality. For example, computing system 700 may also include additional storage (removable and/or non-removable) including, but not limited to, magnetic or optical disks or tape. Such additional storage is illustrated in FIG. 7 by data storage device 707. Computer storage media includes volatile and nonvolatile, removable and non-removable media implemented in any method or technology for storage of information such as computer readable instructions, data structures, program modules or other data. RAM 702, ROM 703, and data storage device 707 are all examples of computer storage media.

Computer system 700 also comprises an optional alphanumeric input device 706, an optional cursor control or directing device 707, and one or more signal communication interfaces (input/output devices, e.g., a network interface card) 708. Optional alphanumeric input device 706 can communicate information and command selections to central processor 701. Optional cursor control or directing device 707 is coupled to bus 709 for communicating user input information and command selections to central processor 701. Signal communication interface (input/output device) 708, also coupled to bus 709, can be a serial port. Communication interface 709 may also include wireless communication mechanisms. Using communication interface 709, computer system 700 can be communicatively coupled to other computer systems over a communication network such as the Internet or an intranet (e.g., a local area network), or can receive data (e.g., a digital television signal).

Although the subject matter has been described in language specific to structural features and/or processological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
a computing device executing a client browser;
an application executing on a plurality of cloud infrastructure components communicatively coupled to the computing device, the plurality of cloud infrastructure components comprising:
a static host configured to host static content in a static anchor page of a website corresponding to the application and to receive a communication request from the client browser, the static anchor page comprising a server file and a load balance file;
a plurality of web servers communicatively coupled to the static host and configured to host dynamic content corresponding to the application; and
an application engine communicatively coupled to the plurality of web servers and configured to collect and forward Internet Protocol (IP) address and load information corresponding to the plurality of web servers to the client browser and
wherein, the static host is configured to load static content in the client browser in response to the communication request,
further wherein the client browser is configured to select a target web server from the plurality of web servers based on the load information and to forward a data request for dynamic content to the target web server based on the IP address information.

2. The system according to claim 1, wherein the client browser is configured to examine the load information from the application engine to derive respective current loads of the plurality of web servers, and to select an available web server from the plurality of web servers as the target web server based on the respective current loads.

3. The system according to claim 2, wherein the probability of any web server from the plurality of web servers being selected as the target web server by the client browser is weighted to correspond to a relative current load of the web server.

4. The system according to claim 3, wherein the probability of any web server from the plurality of web servers being selected as the target web server by the client browser is substantially equivalent to an inverse proportion of the relative load of the web server.

5. The system according to claim 1, wherein the client browser is further configured to send the data request to the target web server to initiate accessing of the dynamic content.

6. The system according to claim 5, wherein the target web server is configured to process the data transfer request by invoking a dynamic script processor.

7. The system according to claim 1 wherein the client browser is further configured to send the data request to a proxy hosted on the target web server.

8. The system according to claim 7, wherein the proxy is configured to receive the data request from the client browser, to construct a new data request from data comprised in the data request, to send the new data request to the target web server, and to forward a response from the target web server to the client browser.

9. The system according to claim 8, wherein the data request comprises:
a browser cookie associated with the website; and
a plurality of parameters corresponding to the client browser.

10. The system according to claim 8, wherein the data request comprises an http request.

11. The system according to claim 10, wherein the data request further comprises POST data corresponding to the http request.

12. The system according to claim 11, wherein the POST data corresponding to the http request comprises:
a URL corresponding to the website; and
a message body specifying information for an action being requested.

13. The system according to claim 8, wherein the response from the selected available web server comprises a javascript file,
further wherein the client browser is further configured to execute the javascript file and to update a page display corresponding to the website in the client browser.

14. The system according to claim 8, wherein the response from the selected available web server comprises a set-cookie header,
further wherein the client browser is further configured to update a browser cookie corresponding to the website in response to receiving a set-cookie header.

15. A method comprising:
receiving a communication request from a client browser in a static anchor page of a website corresponding to an application and comprised in a storage host;
based on receiving the communication request, loading the static anchor page in the client browser, the static anchor page comprising a server file and a load balance file;
determining, based on load information of a plurality of web servers, a target web server from the plurality of web servers to send a dynamic content request, the target web server hosting a dynamic content page corresponding to the application;
sending a data request corresponding to the dynamic content request to the target web server;
processing the data request in the target web server; and
returning the result of processing the data transfer request to the client browser,
wherein the storage host, and the plurality of web servers comprise components in a cloud computing infrastructure,
further wherein the server file comprises Internet Protocol (IP) address information corresponding to the plurality of web servers and a respective individual load information of each of the plurality of web servers.

16. The method according to claim 15, wherein the determining a target web server comprises:
examining the load balance file to derive respective current loads of the plurality of web servers; and
selecting a web server from the plurality of web servers as the target web server based on the respective current loads.

17. The method according to claim 15, wherein the determining a target web server comprises randomly choosing a web server from the plurality of web servers, wherein the probability of choosing any web server from the plurality of web servers is weighted to correspond to relative load of the web server.

18. The method according to claim 15, wherein the sending the data request comprises:
sending the data request to a proxy hosted on the target web server;
constructing a new data request from data comprised in the data request; and
sending the new data request to the target web server.

19. The method according to claim 18, wherein the returning the result of processing comprises:
sending the result from the web server to the proxy; and
sending the result from the proxy to the client browser.

20. A non-transitory computer readable storage medium comprising program instructions embodied therein, the program instructions comprising:
instructions to receive a communication request from a client browser in a static anchor page of a website corresponding to an application and comprised in a storage host;

instructions to load the static anchor page in the client browser, the static anchor page comprising a server file and a load balance file;

instructions to determine, in the client browser, and based on load information of a plurality of web servers, a target web server from the plurality of web servers to send a dynamic content request, the target web server hosting a dynamic content page corresponding to the application;

instructions to send a data request corresponding to the dynamic content request to the target web server;

instructions to process the data request in the target web server; and instructions to return the result of processing the data transfer request to the client browser, wherein the storage host and the plurality of web servers comprise components in a cloud computing infrastructure, further wherein the server file comprises Internet Protocol (IP) address information corresponding to the plurality of web servers and a respective individual load information of each of the plurality of web servers.

21. The system according to claim 7, wherein the proxy is configured to validate the data request according to a plurality of filtering rules.

22. The system according to claim 21, wherein the proxy is configured to connect the client browser to the target web server if the data request is validated.

* * * * *

UNITED STATES PATENT AND TRADEMARK OFFICE
CERTIFICATE OF CORRECTION

PATENT NO. : 8,782,130 B2
APPLICATION NO. : 13/612137
DATED : July 15, 2014
INVENTOR(S) : Wee et al.

It is certified that error appears in the above-identified patent and that said Letters Patent is hereby corrected as shown below:

In the Specification

Column 1, line 9, delete "February 10, 2010" and insert -- February 1, 2010 -- therefore.

In the Claims

Column 15, line 12, claim 1 delete "browser and" and insert -- browser; and -- therefore.

Signed and Sealed this
Fourth Day of November, 2014

Michelle K. Lee
*Deputy Director of the United States Patent and Trademark Office*